(12) United States Patent
Staddon et al.

(10) Patent No.: US 7,400,732 B2
(45) Date of Patent: Jul. 15, 2008

(54) SYSTEMS AND METHODS FOR NON-INTERACTIVE SESSION KEY DISTRIBUTION WITH REVOCATION

(75) Inventors: Jessica N. Staddon, Palo Alto, CA (US); Thomas A. Berson, Palo Alto, CA (US); Matthew Franklin, Davis, CA (US); Sara More, La Jolla, CA (US); Michael Malkin, Stanford, CA (US); Ralph C. Merkle, Sunnyvale, CA (US); Dirk Balfanz, Palo Alto, CA (US)

(73) Assignee: Xerox Corporation, Stamford, CT (US)

( * ) Notice: Subject to any disclaimer, the term of this patent is extended or adjusted under 35 U.S.C. 154(b) by 722 days.

(21) Appl. No.: 10/255,964

(22) Filed: Sep. 27, 2002

(65) Prior Publication Data

US 2004/0017916 A1    Jan. 29, 2004

Related U.S. Application Data

(60) Provisional application No. 60/398,123, filed on Jul. 25, 2002.

(51) Int. Cl.
*H04L 9/16* (2006.01)
(52) U.S. Cl. .................... 380/278; 380/277; 380/279
(58) Field of Classification Search ............ None
See application file for complete search history.

(56) References Cited

U.S. PATENT DOCUMENTS

| | | | | |
|---|---|---|---|---|
| 5,663,896 | A  * | 9/1997 | Aucsmith | 713/163 |
| 6,182,214 | B1 * | 1/2001 | Hardjono | 713/163 |
| 6,240,188 | B1 | 5/2001 | Dondeti et al. | |
| 6,594,798 | B1 * | 7/2003 | Chou et al. | 714/820 |
| 2002/0087865 | A1 * | 7/2002 | Eskicioglu | 713/180 |
| 2002/0097877 | A1 * | 7/2002 | Tanimoto | 380/277 |
| 2002/0147906 | A1 * | 10/2002 | Lotspiech et al. | 713/158 |

OTHER PUBLICATIONS

Kurnio, Hartono; Safavi-Naini, Rei; Wang, Huaxiong.A Secure Re-keying Scheme with Key Recovery Property. Lecture Notes in Computer Science. Publisher: Springer Berlin / Heidelberg. ISSN: 0302-9743. vol. 2384/20 Information Security and Privacy: 7th Australasian Conference, ACISP 2002 Melbourne, Australia, Jul. 3-5, 2002. Proceedings. pp. 40-55.*

(Continued)

*Primary Examiner*—Emmanuel L Moise
*Assistant Examiner*—David J Pearson
(74) *Attorney, Agent, or Firm*—Park, Vaughan & Fleming LLP

(57) ABSTRACT

Systems and methods that allow the formation and distribution of session keys amongst a dynamic group of users communicating over an unreliable, or lossy, network. The systems and methods according to this invention allow an intermediate session key contained in an intermediate key distribution broadcast to be determined by receiving a preceding key distribution broadcast that precedes the intermediate key distribution broadcast, the preceding key distribution broadcast including a first portion of the intermediate session key; receiving a subsequent key distribution broadcast that follows the intermediate key distribution broadcast, the subsequent key distribution broadcast including a second portion of the intermediate session key that is distinct from the first portion; and combining at least the first portion of the intermediate session key contained within the preceding key distribution broadcast and the second portion of the intermediate session key contained within the subsequent key distribution broadcast to obtain the intermediate session key.

20 Claims, 8 Drawing Sheets

OTHER PUBLICATIONS

Moni Naor and Benny Pinkas☐☐Efficient Trace and Revoke Schemes☐☐Lecture Notes in Computer Science☐☐vol. 1962☐☐2001☐☐pp. 1-20☐☐.*

Staddon et al., "Self-Healing Key Distribution with Revocation", IEEE Symposium on Security and Privacy 2002, Oakland CA 2002, pp. 241-257.

* cited by examiner

SYSTEMS AND METHODS FOR NON-INTERACTIVE SESSION KEY DISTRIBUTION WITH REVOCATION

This invention was made with Government support under Grant N66001-00-1-8921 awarded by the Space and Naval Warfare Systems Center, San Diego, Calif. The Government has certain rights in this invention.

BACKGROUND OF THE INVENTION

1. Field of Invention

This invention generally relates to the field of secure information communication.

2. Description of Related Art

A group of users can generally communicate securely over a public channel when they all share a common key, such as, for example a session key, which is used to encrypt messages and other communications. Because the group of users may change over time, for example, because some existing users leave the group and/or because some new users join the group, it is desirable to change the encryption communication common key periodically.

Conventional techniques and methods for secure communication have generally been provided for distributing an encryption communication common key over a reliable channel or network.

Often, changing the encryption communication common key must be performed using an unreliable, or lossy, network. However, in an unreliable network, a key distribution broadcast for a particular session might never reach a user in the group. Requiring that each such user contact the group manager to request a re-transmission of the key would contribute to the traffic on a network that might already be heavily burdened. Furthermore, when the user group size is large, such re-transmissions could potentially overwhelm the group manager. Moreover, in some high security communication environments, such as, for example, military applications, it can be important that users avoid sending all but essential messages, lest they make themselves vulnerable by revealing their location.

SUMMARY OF THE INVENTION

This invention provides systems and methods that enable secure information communication over unreliable communication networks.

This invention separately provides systems and methods that provide for non-interactive distribution of one or more unique communication encryption keys.

This invention separately provides systems and methods that allow a user to recover one or more lost encryption communication group keys without requesting additional transmissions from a group manager.

This invention separately provides systems and methods that provide for the revocation of group communication participation privileges for one or more group members.

In various exemplary embodiments, the systems and methods according to this invention allow a member of a communication group who has not received an intermediate key distribution broadcast to determine the intermediate session key. In such exemplary embodiments, the systems and methods according to this invention determine the intermediate session key by combining a preceding key distribution broadcast that precedes the intermediate key distribution broadcast with a subsequent key distribution broadcast that follows the intermediate key distribution broadcast using one or more self-healing key distribution techniques according to this invention.

In various exemplary embodiments, the systems and methods according to this invention allow a group manager managing the communication group to distribute to one or more members of the group a set of distinct keys as part of one or more of key distribution broadcasts, where the set of distinct keys is constructed based a session revocation capability that revokes an access to one or more of the broadcast sessions for one or more members of the group.

In various exemplary embodiments, the systems and methods according to this invention employ one or more self-healing session key distribution techniques that use one or more polynomial-based secret sharing techniques to encode a preceding key distribution broadcast and to encode a subsequent key distribution broadcast to allow a user receiving the preceding and subsequent key distribution broadcasts to determine an intermediate key, usable to decrypt a received encrypted intermediate broadcast session that was distributed between the preceding and subsequent key distribution broadcasts.

These and other features and advantages of this invention are described in, or are apparent from, the following detailed description of various exemplary embodiments of the systems and methods according to this invention.

BRIEF DESCRIPTION OF THE DRAWINGS

Various exemplary embodiments of the systems and methods of this invention described in detail below, with reference to the attached drawing figures, in which.

DETAILED DESCRIPTION OF EXEMPLARY EMBODIMENTS

The systems and methods of this invention allow the formation and distribution of group keys amongst a dynamic group of users communicating over an unreliable, or lossy, network.

The key distribution techniques discussed in various embodiments of systems and methods of this invention have been based on the self-healing key distribution and revocation systems and techniques disclosed in J. Staddon at al., "Self-Healing Key Distribution with Revocation," IEEE Symposium on Security and Privacy 2002, May 2002, Oakland, Calif., pp. 241-257, which is incorporated herein by reference in its entirety. The key distribution techniques are labeled "self-healing" because users are capable of recovering lost group keys on their own, that is, without requesting additional transmissions from the distributor of the keys, such as, for example, a group manager.

Figure 1:
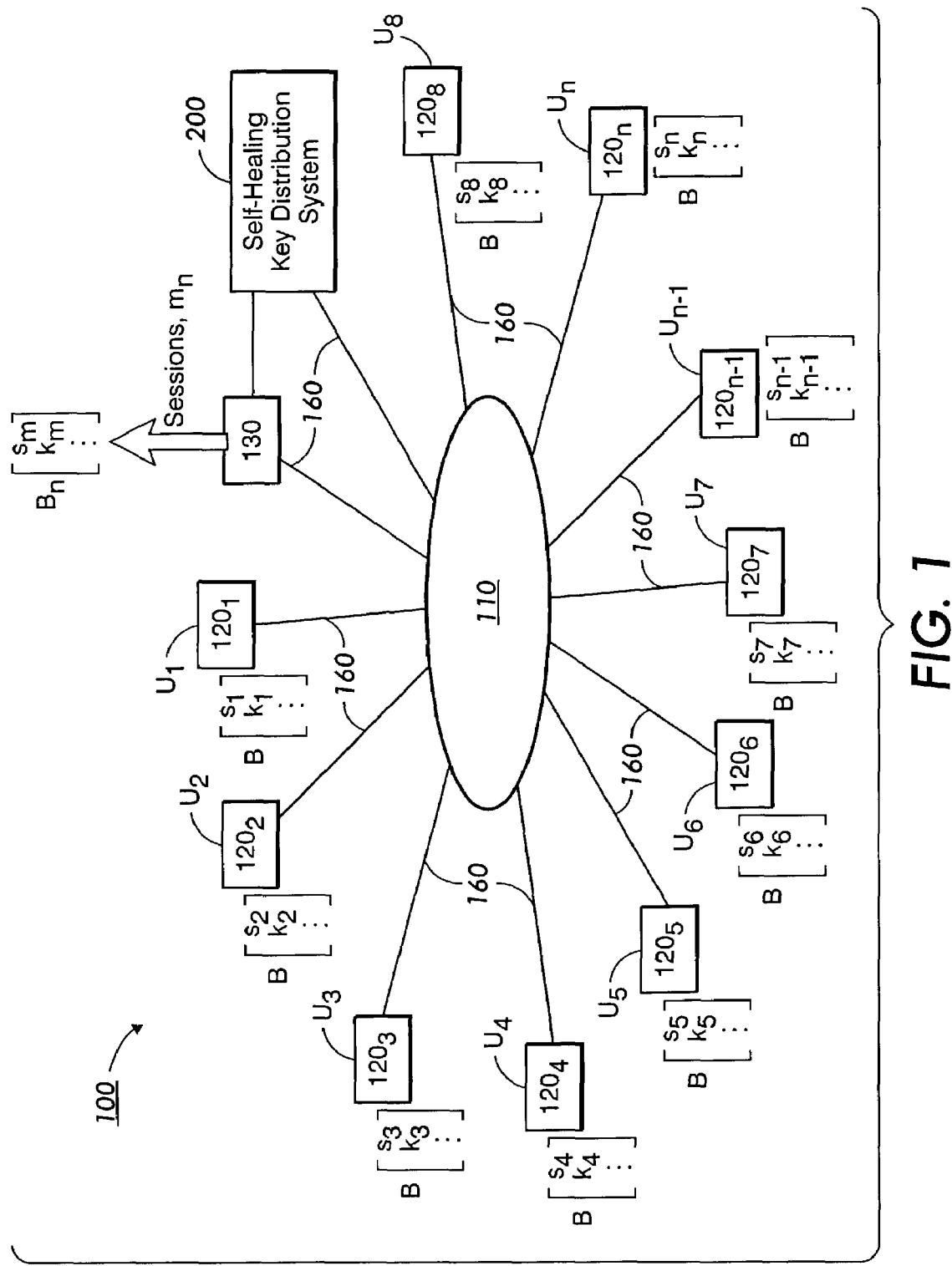
FIG. 1 illustrates a large non-secure communication network environment.

FIG. 1 shows one exemplary embodiment of a communication network environment 100 that the systems and methods according to this invention are usable with. As shown in FIG. 1, the communication network environment 100 includes a public channel or non-secure network 110. One or more user access devices $120_1$-$120_n$, which are useable by a group of n users, $U_1$-$U_n$, to communicate with each other, can be connected to the public channel or non-secure network 110 over corresponding communication links 160. The network 110 also includes an access device 130 that is used by a communication group manager $U_0$ to perform various tasks such as, for example, communicating with one or more of the group users U, facilitating and/or coordinating communications between the users U, and the like, as well as controlling and/or managing the distribution of session keys to the one or more users $U_1$-$U_n$, and/or dynamically changing active (i.e., non-revoked) subsets or supersets of the users $U_1$-$U_n$. The group manager's access device 130 also includes or is connected to a self-healing key distribution system 200, which itself is connected to the public channel or non-secure network 110 via one of the communication links 160.

The public channel or non-secure network 110 includes, but is not limited to, for example, local area networks, wide area networks, storage area networks, intranets, extranets, the Internet, or any other type of distributed network, each of which can include wired and/or wireless portions.

The access devices 120 and 130 can each be any known or later developed device that provides access to a user to the communications network 110. In various exemplary embodiments, various ones of the access devices 120 and 130 can each be implemented using a desktop computer, a laptop computer, a handheld computer, a personal digital assistant, a cellular phone, a web appliance and/or any other device that provides a suitable level of connectivity and processing power to allow the communications over the communication network to be received and, if necessary, to be processed, encrypted or the like and/or to allow communications to be processed, encrypted or the like, if necessary, and to be provided to the communications network 110.

As shown in FIG. 1, the group manager connects to the public channel or non-secure network 110 via one of the communication links 160. The communication links 160 can be any known or later developed device or system for connecting the access devices 120 and 130 and the selfhealing key distribution system 200 to the network 110, including a connection over public switched telephone network, a direct cable connection, a connection over a wide area network, a local area network and/or a storage area network, a connection over an intranet and/or an extranet, a connection over the Internet, or a connection over any other distributed processing network or system. In general, the links 160 can be different from each other and each link 160 can be any known or later developed connection system or structure usable to connect the access devices 120 or 130 or the self-healing key distribution system 200 to the network 110.

To enable secure multicast communication between the group members/users $U_1$-$U_n$, over the public channel or non-secure communication network 110, the group manager $U_0$ issues to each group user a personal key $S_1$-$S_n$. The personal key $S_i$ is generally issued to a group user $U_i$ when the group user $U_i$ joins the group for the first time.

Periodically, the group manager $U_0$ distributes of a new key $K_i$, called a session key, to group users prior to or during a session m. All messages exchanged within the group during a fixed interval of time and/or during the specific session $m_j$, are communicated securely through encryption under a particular session key $K_j$.

Generally, prior to the start of each session $m_j$, the group manager $U_0$ transmits at least one key distribution broadcast $B_j$ which includes that session's key, $K_j$, as well as other information, to the group. Because group membership is dynamic, that is, because new users may be periodically added to the group and/or existing users may be periodically removed from the group, each key distribution broadcast B targets only the group members current for that key distribution broadcast B.

In various exemplary embodiments, the self-healing key distribution system 200 allows one or more group members/users $U_1$-$U_n$, who, due to network failures or other communication interruptions, do not receive a particular session key $K_j$ via the key distribution broadcast $B_j$, to recover the session key $B_j$ on their own. To be able to recover the key $K_j$ through self-healing key reconstruction techniques discussed in detail below, a user $U_i$ must generally be a member both before and after the session $m_j$ for which a particular key $K_j$ is to be used.

In various exemplary embodiments, from each key distribution broadcast B, a user $U_i$ recovers the current session key K and shares of each of a number y of previous session keys, and a number z of future session keys, respectively. Hence, in each key distribution broadcast $B_j$, a user learns the actual session key $K_j$ for that key distribution broadcast B, and shares of the actual session keys $K_{j-1}$ to $K_{j-y}$ and $K_{j+1}$ to $K_{j+z}$ for each of the y preceding sessions and of subsequent sessions, respectively. The share of the current session key $K_j$ that is received in each preceding key distribution broadcast $B_{j-y}$ to $B_{j-i}$ is complementary to the share of the current session key $K_j$ that is received in each key distribution $B_{j+1}$ to $B_{j+3}$. Hence, a user who is a member in both any one of the preceding y sessions and any one of the subsequent z sessions will be able to reconstruct the current session key $K_j$ even if the current key distribution broadcast $B_j$ is not received.

In various exemplary embodiments, the self-healing key distribution techniques which the self-healing key distribution system 200 uses to construct the shares of the z future session keys K and y previous session keys K for a current key distribution broadcast B are based on secret sharing techniques that bind the ability of users to recover from key distribution broadcast losses to the user's membership status, as discussed by A. Shamir, "How to Share a Secret", in Communications of the ACM, 22, 1979, pp. 612-613, which is incorporated herein by reference in its entirety.

Figure 2:
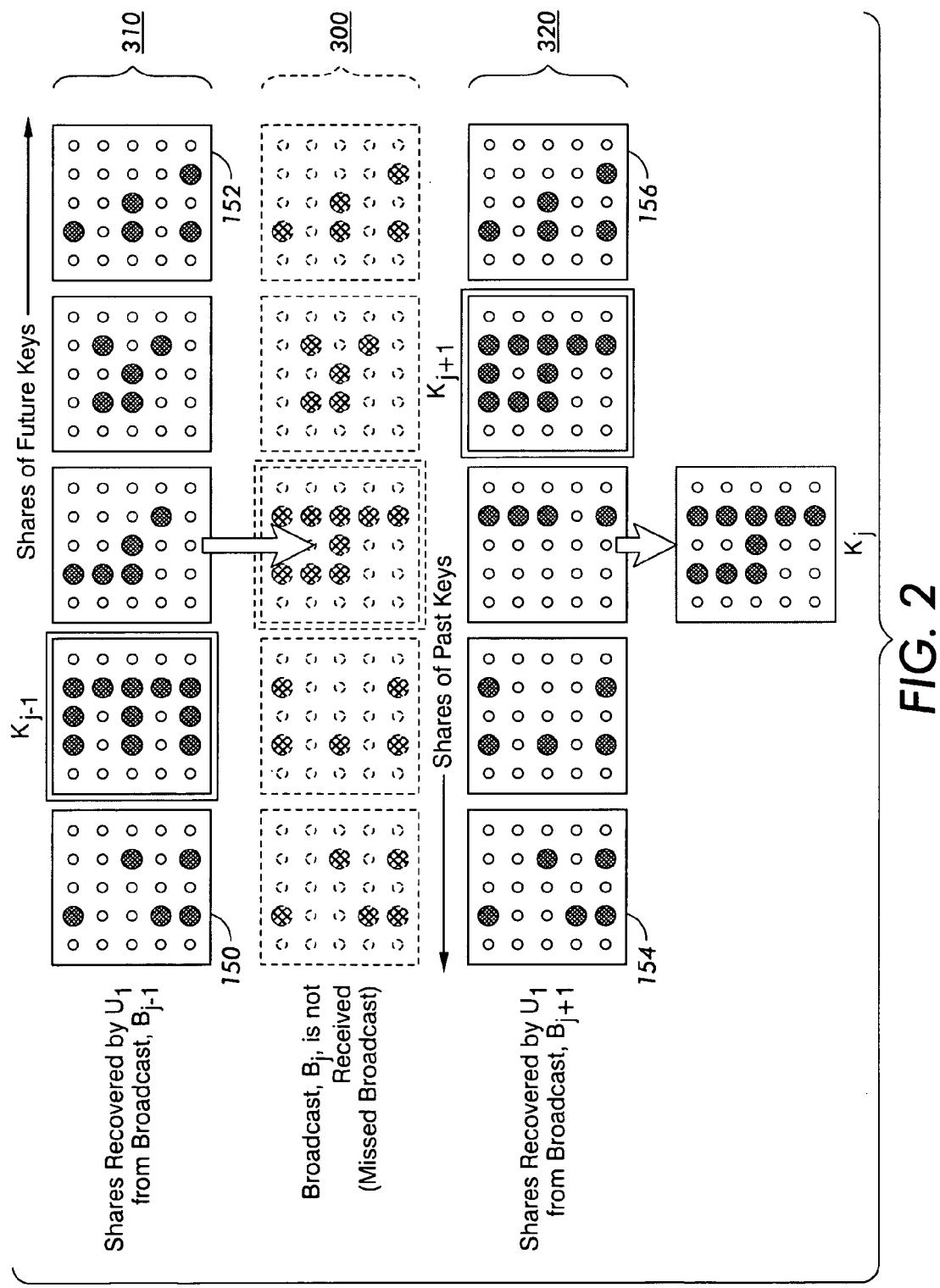
FIG. 2 is a pictorial representation of one exemplary embodiment of a self-healing key distribution/reconstruction technique according to this invention.

FIG. 2 schematically illustrates one exemplary embodiment of the self-healing key distribution and reconstruction techniques according to this invention. As shown in FIG. 2, a user U who has been a member of the group misses an intermediate key distribution broadcast $B_j$ 300 that includes the session key $K_j$ for the $m_j$ communication message and/or session.

For example, to reconstruct the session key $K_j$ in a non-interactive manner, from a preceding key distribution broadcast, for example the last key distribution broadcast $B_{j-1}$ 310, the user U recovers a share $K'_{j-2}$ of a preceding key $K_{j-2}$, the session key $K_{j-1}$, for that preceding key distribution broadcast $B_{j-1}$ and shares $K_j''$, $K_{j+1}''$ and $K_{j+2}''$ for subsequent session keys $K_j$, $K_{j+1}$ and $K_{j+2}$. From a subsequent broadcast, for example next the key distribution broadcast $B_{j+1}$ 320, the user U recovers the same share $K'_{j-2}$ of the preceding session key $K_{j-2}$, a share $K_{j-1}'$ of the preceding session key $K_{j-1}$ and a share $K'_j$ of the missing session key $K_j$ of the session key for the missed key distribution broadcast $B_j$, the session key $K_{j+1}$ for the subsequent key distribution $B_{j+1}$ and the same share $K_{j+2}''$ of the subsequent key $K_{j+2}$. As a result of the information received in preceding broadcast $B_{j-1}$ and subsequent broadcast $B_{j+1}$ the user U now has shares $K_j'$ and $K_j''$ of the missed session key $K_j$ that, when appropriately combined, form the session key $K_j$, and thus can recover the missing session key $K_j$, according to various embodiments of this invention, even though the key distribution broadcast $B_j$ was not received. In various exemplary embodiments, the shares K' and K" are distinct. In some exemplary embodiments, the distinct shares K' and K" are complimentary.

FIG. 2 represents the self-healing property in an intuitive way. The value of the session key K cannot be identified, when each session key share K' or K" is considered alone. However, when the shares K' and K" are combined, the value of a session key K can be determined in a straightforward manner.

A group member recovers the lost session key $K_j$ by combining information from any key distribution broadcast $B_{j-y}$ preceding the lost broadcast $B_j$ that contains a share $K_j'$ of the lost session key $K_j$ with information from any key distribution broadcast $B_{j+z}$ following the lost $B_j$ broadcast that contains a share $K_j''$ of the lost session key $K_j$ based on the self-healing key distribution technique. In other words, in order to recover a lost session key $K_j$, the user must have received key distribution broadcasts for any two sessions which "sandwich" the session corresponding to the lost key distribution broadcast and that contain the shares $K_j'$ and $K_j''$.

In various exemplary embodiments, to reconstruct, recover and/or determine a lost session key $K_j$, the user member employs one or more self-healing key reconstruction techniques to combine the information from an appropriate key distribution broadcast $B_{j-y}$ preceding the lost broadcast $B_j$ with information from an appropriate key distribution broadcast $B_{j+z}$ following the lost $B_j$ broadcast.

In various exemplary embodiments, when self-healing key distribution is implemented for a sequence of m sessions where m≦y+1 and y=z, it is possible to miss all but the first and last key distribution broadcasts $B_1$ and $B_{z+1}$, and still be able to recover all the session keys.

In various exemplary embodiments, the self-healing key distribution system 200 enables distribution of session keys in a manner that is resistant to key distribution broadcast loss.

Basing session key recovery on the possession of sandwiching key distribution broadcasts $B_{j-y}$ and $B_{j+z}$ allows the use of a flat, rather than hierarchical, key management system. In such a system, each personal key $S_i$, where a personal key $S_i$ is the collection of secrets that allows users to decrypt broadcast messages, is known to exactly one user, thus enabling traceability. Further, lost broadcasts are constructed in a stateless manner.

The cost of these benefits is an increase in communication overhead. However, because the keying information is naturally decoupled from the content in the session key setting, the overhead is incurred on the smaller payload, i.e., the session keys. On the content, a low-overhead reliability mechanism, such as for example, forward error correction, can be used.

As discussed in detail below, in various exemplary embodiments, the self-healing key distribution techniques provide key distribution broadcast self-healing as well as the ability to revoke users from, and add users to, the group, while being resistant to collusion attacks. If a key distribution mechanism cannot be broken by any coalition of up to t users, that system is resistant to coalitions of size t.

The self-healing property requires that an appropriate pair of proceeding and subsequent key distribution broadcasts be sufficient to recover the lost key. With this self-healing requirement, it is possible to communicate with all group members through short broadcasts even though the underlying set of personal keys is flat rather than hierarchical, i.e., that each key is stored by at most one user. This has the advantage of permitting traceability of keys and/or broadcasts. In addition, the flat key structure does not penalize members for being off-line for a period of time.

It should be appreciated that the keying information is decoupled from the content or message. Pairing the two makes sense if the group manager is the only sender. However, in the multi-sender setting considered for self-healing key distribution systems and methods according to this invention, doing so would require passing all messages through the group manager first, as appending the necessary keying information in a secure way requires knowledge of the various users' personal keys.

Figure 3:
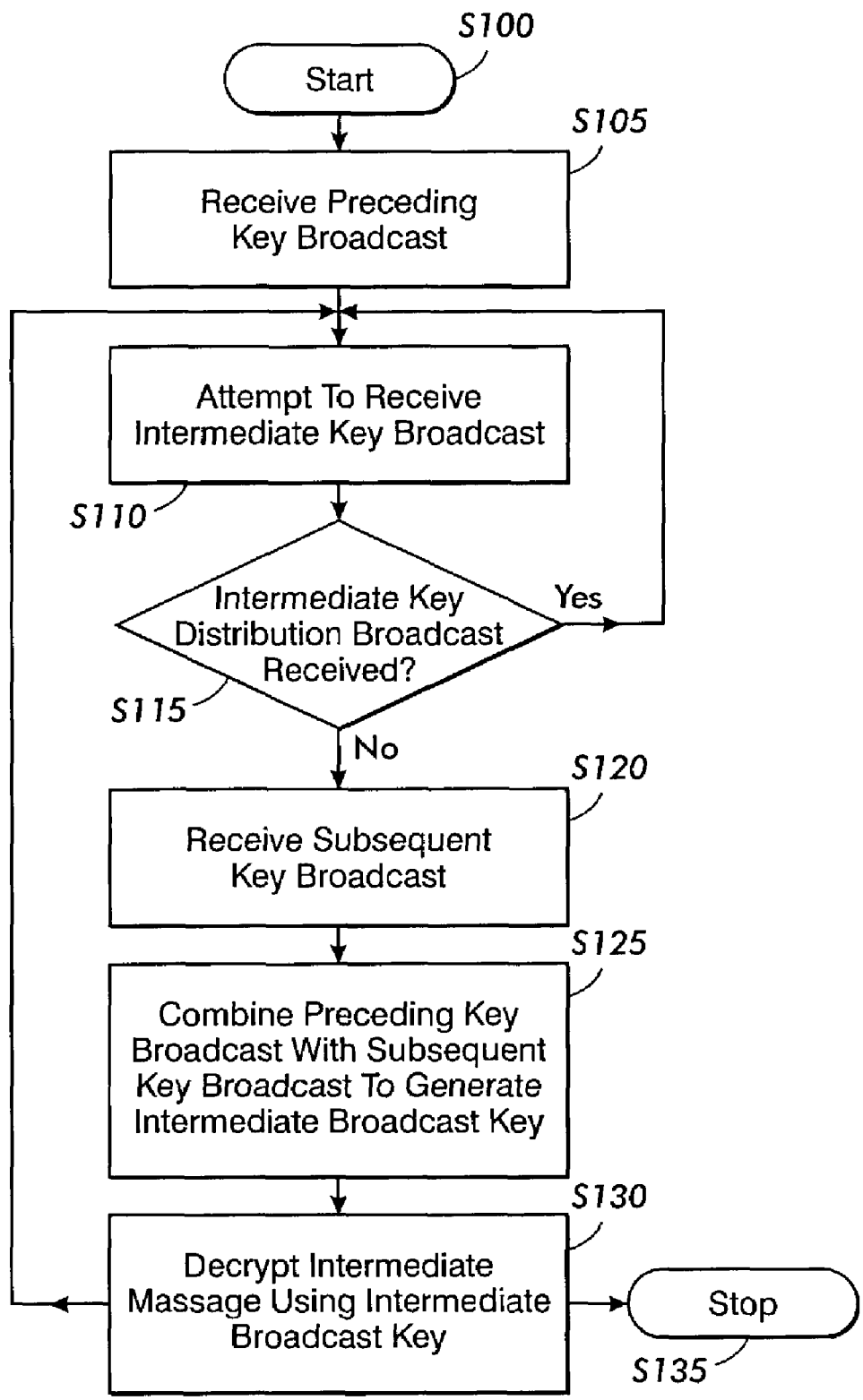
FIG. 3 is a flowchart outlining one exemplary embodiment of a method for determining a lost session key for an encrypted broadcast session according to this invention.

FIG. 3 is a flowchart outlining one exemplary embodiment of a method for a user to determine a lost session key for an encrypted intermediate broadcast session according to this invention. As shown in FIG. 3, the method begins in step S100, and continues to step S105, one or more preceding key distribution broadcasts are received by the user member from the group manager. Each preceding key distribution broadcast includes the session key for the corresponding session and shares of session keys for at least some of the preceding sessions and different shares of session keys for at least some of the subsequent sessions. Operation then continues to step S110.

In step S110, the user attempts to recover the subsequent intermediate key distribution broadcast. Then, in step S115, a determination is made whether the user has missed the intermediate key broadcast. If the user member missed the intermediate key distribution broadcast, operation continues to step S120. Otherwise, because that intermediate key distribution broadcast was received, operation returns to step S110.

In step S120, the user receives a subsequent key distribution broadcast which occurs some time after the intermediate broadcast that the user member missed. Next, in step S125, the intermediate session key for the encrypted intermediate broadcast is determined by combining the share K' of the missed session K received with the received preceding key distribution broadcast and the share K" of the missed session key K received with the received subsequent key distribution broadcast. Then, in step S130, the user employs the recovered intermediate key K reconstructed in step S125 to decrypt the corresponding intermediate session m. Operation then returns to step S110. Operation of the method thus continues until all of the key distribution broadcasts have been sent to the user.

In various exemplary embodiments, the one or more self-healing session key distribution techniques is based on one or more polynomial-based secret sharing techniques discussed above and summarized as shown in Eq. 1 below:

$$B_j = \{h_1(x)+p_1(x), \ldots, h_{j-1}(x)+p_{j-1}(x), h_j(x)+K_j, h_{j+1}(x)+ q_{j+1}(x), \ldots, h_m(x)+q_m(x))\}. \quad (1)$$

Figure 4:
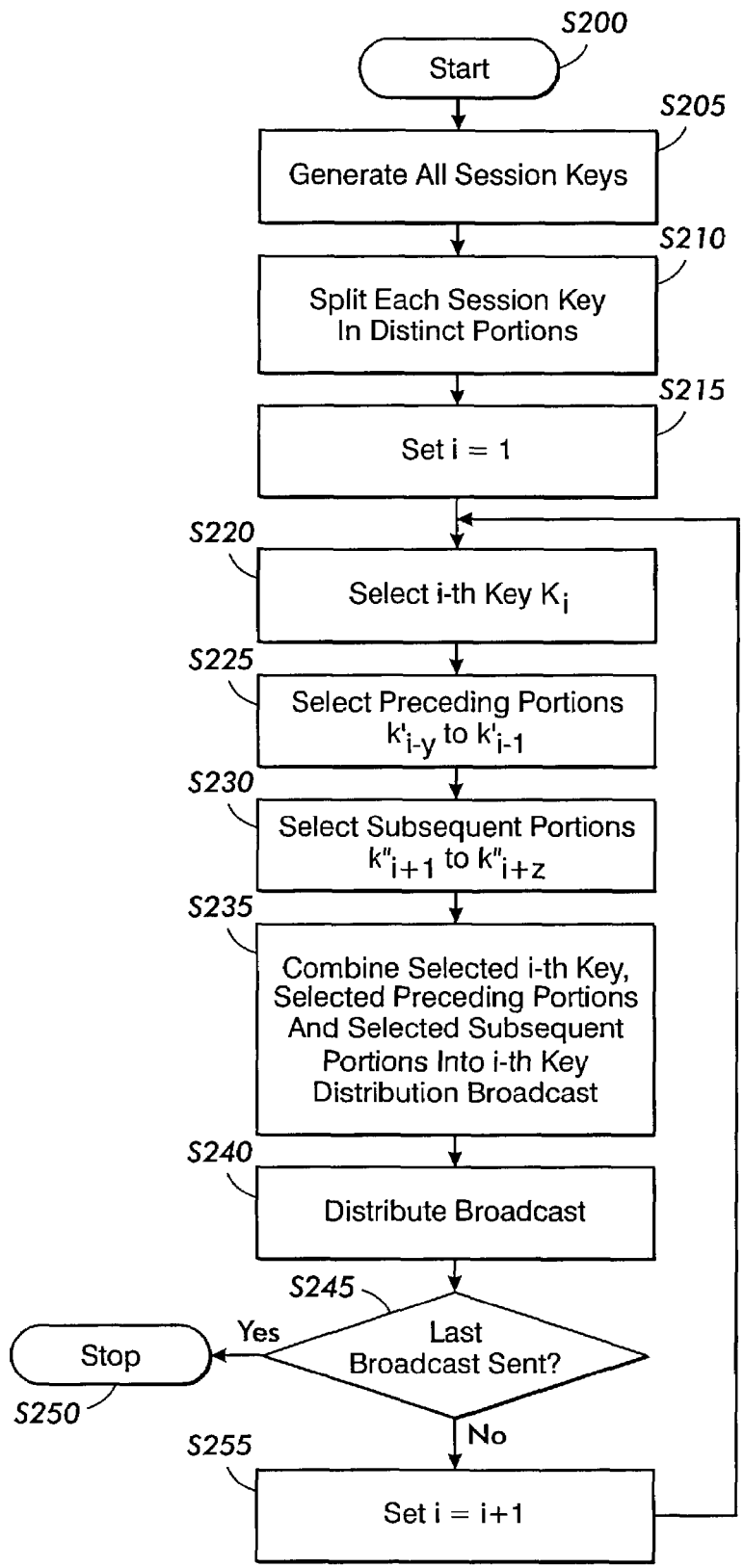
FIG. 4 is a flowchart outlining one exemplary embodiment of a method for providing a plurality of self-healing key distribution broadcasts according to this invention for a known or fixed number of sessions.

FIG. 4 is a flowchart outlining one exemplary embodiment of a method for providing a plurality of self-healing key distribution broadcasts for a known or fixed number of sessions according to this invention As shown in FIG. 4, the method begins in step S200, and continues to step S205, where the group manager generates all session keys for a known number of communication sessions. Next, in step S210, each of the session keys is split into two distinct portions representing key shares of that particular session key. Operation then continue to step S215 where an index i=1 is set to allow various session keys to be iteratively selected to be included in the broadcast.

In step S220, a session key corresponding to the particular session key index is selected. Next, in Step S225, portions of up to y preceding session keys (if any) are selected. Then, in Step S230, portions of up to z subsequent session keys (if any) are selected. Operation then continues to step S235.

In step S235, the current session key and up to y shares of previous session keys and up to z shares of subsequent session keys are combined to form the i-th key distribution broadcast. Then, in step S240, the i-th key distribution broadcast is distributed. Next, in step S245, a determination is made whether the last key distribution broadcast has been sent. If so, operation continues to step S250 where operation of the method stops. If not, operation continues to step S255 where the session index is incremented by 1. Operation then returns to step S220.

Figure 5:
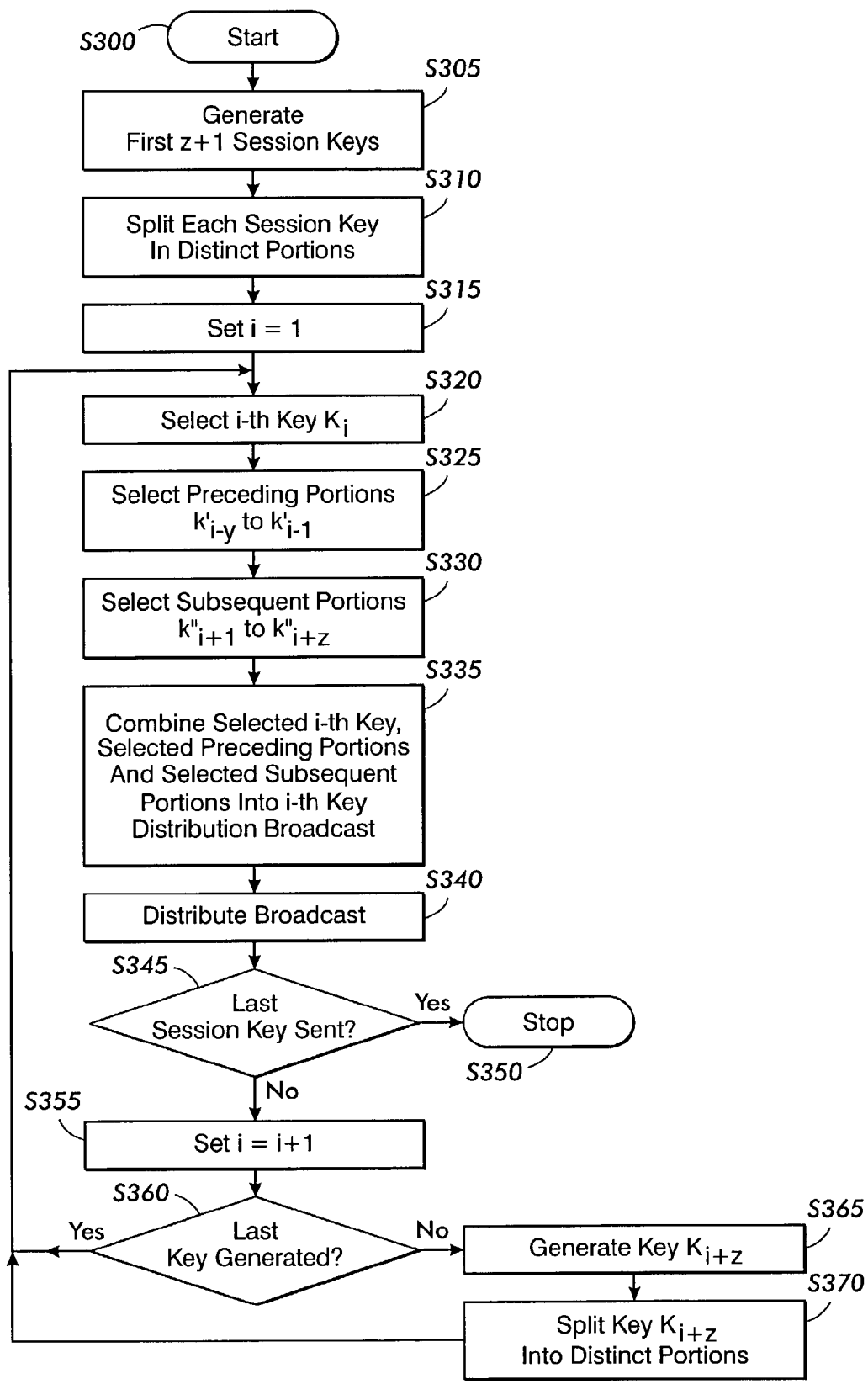
FIG. 5 is a flowchart outlining one exemplary embodiment of a method for providing a plurality of self-healing key distribution broadcasts according to this invention when the number of sessions is unknown.

FIG. 5 is a flowchart outlining one exemplary embodiment of a method for providing a plurality of self-healing key distribution broadcasts when the number of sessions is unknown according to this invention As shown in FIG. 5, the method begins in step S300, and continues to step S305, where the group manager generates a first set of session keys. Next, in step S310, each of the session keys is split into two distinct portions representing key shares of that particular session key. Operation then continue to step S315 where an index i=1 is set to allow various session keys to be iteratively selected for being included in the broadcast.

In step S320, a session key corresponding to the particular session key index is selected. Next, in Step S325, portions of up to y preceding session keys (if any) are selected. Then, in Step S330, portions of up to z subsequent session keys (if any) are selected. Operation then continues to step S335.

In step S335, the current session key and up to y shares of previous session keys and up to z shares of subsequent session keys are combined to form the i-th key distribution broadcast. Then, in step S340, the i-th key distribution broadcast is distributed. Next, in step S345, a determination is made whether the last key distribution broadcast has been sent. If so, operation continues to step S350 where operation of the method stops. If not, operation continues to step S355 where the session index is incremented by 1. Operation then continues to step S360.

In step S360, a determination is made whether the last key has been generated. If so, operation returns to step S320 where the operation of the method is repeated. If, not, operation continues to step S365 where another session key is generated. Next, at step S370, the new session key generated is split into two distinct portions representing key shares of that particular session key. Operation then returns to step S320 where the operation of the method is repeated until last key is generated and the last session key is sent to the group users.

In various exemplary embodiments, to achieve the goal of providing secure communication for large groups, a broadcast-based approach to key distribution is taken. In a key distribution scheme, a group manager seeks to establish a new unique key with each user over a broadcast channel. In a session key distribution scheme, a group manager seeks to establish a common key (the session key) with everyone in the group at or before the beginning of each session, where a session is simply a fixed interval of time. In each setting, the ability to revoke users, and thus prevent them from learning new keys, is important.

Generally, a scheme is considered to have a t-revocation capability if it is possible to prevent t users at a time from learning the new session key. When distributing session keys, the self-healing property is considered, which states that a member in three sequential, although not necessarily consecutive, sessions can recover the session key corresponding to the intermediate session by using information recovered from the first and last of the three broadcasts. All of the processing techniques presented herein are resistant to coalitions of t users. That is, any t colluding users, whether revoked or not, are unable to recover information they are not entitled to access.

A definition of an unconditionally secure model of session key distribution is presented first below. Many of the definitions and results presented herein make use of information theory concepts, such as, for example, the entropy function, H(.), which is well known in the art.

A setting in which there is a group manager $U_0$ and n users $U_1, \ldots, U_n$ is considered. All operations take place in a finite field, $F_q$, where q is a prime number that is larger than n. Each user, $U_i$, stores a personal key, $S_i \subseteq F_q$, where $S_i$ may be a subset of elements of $F_q$. We use k to denote a single key (i.e., an element of $F_q$). We allow for the possibility that individual keys may be related.

As part of the first definition, key independence, $\{ki\}_{i \in (1, \ldots, n)} \subseteq F_q$ is a set of t-wise independent keys, if for every subset of t distinct indices $\{i_1, \ldots, i_t\}$, $H(k_{i2}, \ldots, k_{it}) = H(k_{i1})$. We denote the number of sessions by m, and the set of users who are revoked in session j, and thus unable to recover that session's key, by R. If $U_1 \notin R$, we say $U_i$ is a member (or, an active user). The session keys $\{K_1, \ldots, K_m\}$, are generated independently at random. For $j \in \{1, \ldots, m\}$, the session key, $K_j$, is sent to the group members through a broadcast, $B_j$, from the group manager. For any non-revoked user $U_i$, the jth session key, $K_j$, is determined by $B_j$ and $S_i$. The set of revoked users, R, will be clear from context.

Because in a session key distribution scheme a user potentially learns from $B_j$, information about session keys other than $K_j$, it is helpful to introduce a variable $z_{i,j}$ to represent all the information $U_i$ learns through knowledge of both $B_j$ and $S_i$. More precisely: $H(z_{i,j}|B_j,S_i)=0$ but $H(z_{i,j}|B_j)=H(z_{i,j})=H(z_{i,j}|S_i)$. For example, if $U_i$ is a group member, then $z_{i,j}$ will include $K_j$ and possibly information on other session keys, whereas if $U_i$ is revoked then $z_{i,j}$ contains no information on $K_j$ and may in fact be the empty set.

It is appreciated that it is important to prepare for all types of collusion attacks when designing key distribution schemes. If the scheme is such that sensitive information is embedded in users' personal keys, a coalition of users may be unwilling to share their personal keys and consequently can only attack session keys. Such a coalition could consist of α revoked users who collude with t-α new group members to recover session keys for sessions in which none of the colluding users were members. Security against such a collusion attack motivates the definition of self-healing in the second definition.

The second definition, Session Key Distribution definition, is presented next.

First, let, $i \in \{1, \ldots, n\}$ and $j \in \{1, \ldots, m\}$.

D is a session key distribution scheme if the following are true:

(a) For any member $U_i$, $K_j$ is determined by $z_{i,j}$, which in turn is determined by $B_j$ and $S_i$ ($H(K_j|z_{i,j})=0$ and $H(z_{i,j}|B_j, S_i)=0$).

(b) For any set $B \subseteq \{U_1, \ldots, U_n\}$, $|B| \leq t$, and $U_i \notin B$, the users in B cannot determine anything about $S_i (H(S_i | \{S_{i'}\}_{U_{i'} \in B}, B_1, \ldots, B_m) = H(S_i))$ (c) What members $U_i, \ldots, U_n$ learn from $B_j$ can't be determined from the broadcasts or personal keys alone ($H(z_{i,j}|B_1, \ldots B_m) = H(z_{i,j}) = H(z_{i,j}|S_1, \ldots, S_n)$).

D has t-revocation capability if given any set $R \subseteq \{U_1, \ldots, U_n\}$ where $|R| \leq t$, the group manager can generate a broadcast $B_j$, such that for all $U_i \notin R$, $U_i$ can recover $K_j$ ($H(K_j|B_j, S_i)=0$), but the revoked users cannot ($H(K_j|B_j, \{S_{i'}\}_{U_{i'} \in R}) = H(K_j)$).

D is self-healing if the following are true for any $1 \leq j_1 \leq j \leq j_2 \leq m$:

(a) For any $U_i$ who is a member in session's $j_1$ and $j_2$, $K_j$ is determined by the set, $\{z_{i,j_1}, z_{1i,j_2}\}(H(K_j|z_{i,j_1}, z_{i,j_2})=0)$ (b) For any disjoint subsets B, $C \subset \{U_1, \ldots U_n\}$ where $|B \cup C| \leq t$, the set $\{z_{i,j}\}_{U_{i'} \in B, 1 \leq j \leq j_1} \cup \{z_{i',j}\}_{U_{i'} \in C, m \leq j \leq j_2}$, contains no information on Kj ($H(Kj|\{z_{i,j}\}_{U_{i'} \in B, 1 \leq j \leq j_1} \cup \{z_{i',j}\}_{U_{i'} \in C, m \leq j \leq j_2}) = H(K_j)$).

In various exemplary embodiments, the self-healing key distribution technique uses secret sharing as discussed by A. Shamir, How to Share a Secret, in Communications of the ACM, 22, 1979, pp. 612-613, which is incorporated herein by reference in its entirety, and presented above.

In order to provide resistance to collusion attacks, in the self-healing key distribution schemes that are based on this mechanism, the shares 150, 152, 154, 156 (shown in FIG. 3) recovered by different users are different. The collusion resistance of a key distribution scheme is correlated with the degree of dependence between the shares recovered by the users in each period 310, 320 (as shown in FIG. 3). Any desired level of coalition resistance can be accomplished by using polynomials of sufficiently high degree to determine the values of the shares.

As part of determining a self-healing session key distribution technique or scheme without revocation capability (Construction 1), the following are provided below.

First, let t be a positive integer. The group manager chooses 2 m polynomials in $F_q[x]$, each of degree t, $h_1, \ldots, h_m$, $p_1, \ldots, p_m$, and m session keys, $K_1, \ldots, K_m \in F_q$, all at random. For each $j \in \{1, \ldots, m\}$, define a polynomial in $F_q[x]$, $q_j(x) = K_j - p_j(x)$. For $i \in \{1, \ldots, n\}$, user $U_i$ stores the personal key $S_i = \{i, h_1(i), \ldots, h_m(i)\} \subseteq F_q$.

Next, in session $j \in \{1, \ldots, m\}$, the broadcast is:

$$Bj = \{h_1(x)+p_1(x), \ldots, h_{j-1}(x)+p_{j-1}(x), h_j(x)+K_j h_{j+1}(x)+q_{j+1}(x), \ldots, h_m(x)+q_m(x)\}. \quad (2)$$

The Session Key and Shares Recovery in Session j is described next below. For all $i \in \{1, \ldots, n\}$, $U_i$ recovers $K_j$ from broadcast $B_j$ by evaluating $hj(x)+K_j$ at i and subtracting $h_j(i)$ (the latter is part of $S_i$). Similarly, $U_i$ recovers session key shares $\{p_1(i), \ldots, p_{j-1}(i), q_{j+1}(i), \ldots, q_m(i)\}$. Self-healing is then possible because in session $j_1 < j$, $U_i$ recovers share $q_j(i)$ in session $j_2 > j$, $U_i$ recovers share $p_j(i)$, and $p_j(i)+q_j(i)=K_j$.

Adding a user to this scheme during session j' is straightforward, provided the underlying field is sufficiently large. First, the group manager sends a new member a unique identity, $i \in F_q$, and the corresponding points on the polynomials $\{hj(i)\} j \in \{j'', \ldots, m\}$. However, Construction 1 has no revocation capability. The sections below provide a description of how Construction 1 may be combined with Construction 2 to achieve self-healing key distribution with revocation.

First, a technique for distributing one set of distinct, but related, keys to a select subset of users over a broadcast channel is presented in detail below. This technique allows the addition of revocation capability to the self-healing technique.

It will be appreciated that the ability to distribute distinct keys to subset of users is important to self-healing key distribution. The reason is that although the main objective is the distribution of common keys, for example, session keys, this distribution is done reliably by also distributing shares of keys, and these shares must be distinct to ensure collusion resistance. One exemplary embodiment of such a technique is based on the Naor-Pinkas unconditionally secure method for establishing a common key over a broadcast channel, as discussed by M. Naor and B. Pinkas, Efficient Trace and Revoke Schemes, in Proceedings of Financial Cryptography 2000, Lecture Notes in Computer Science (2001) 1962, pp. 1-20, which is incorporated herein by reference in its entirety.

The keys distributed in the revocation technique mechanism are each a point on a polynomial. The size of the broadcast grows with the square of the degree of collusion resistance desired, not with the total number of users.

Figure 6:
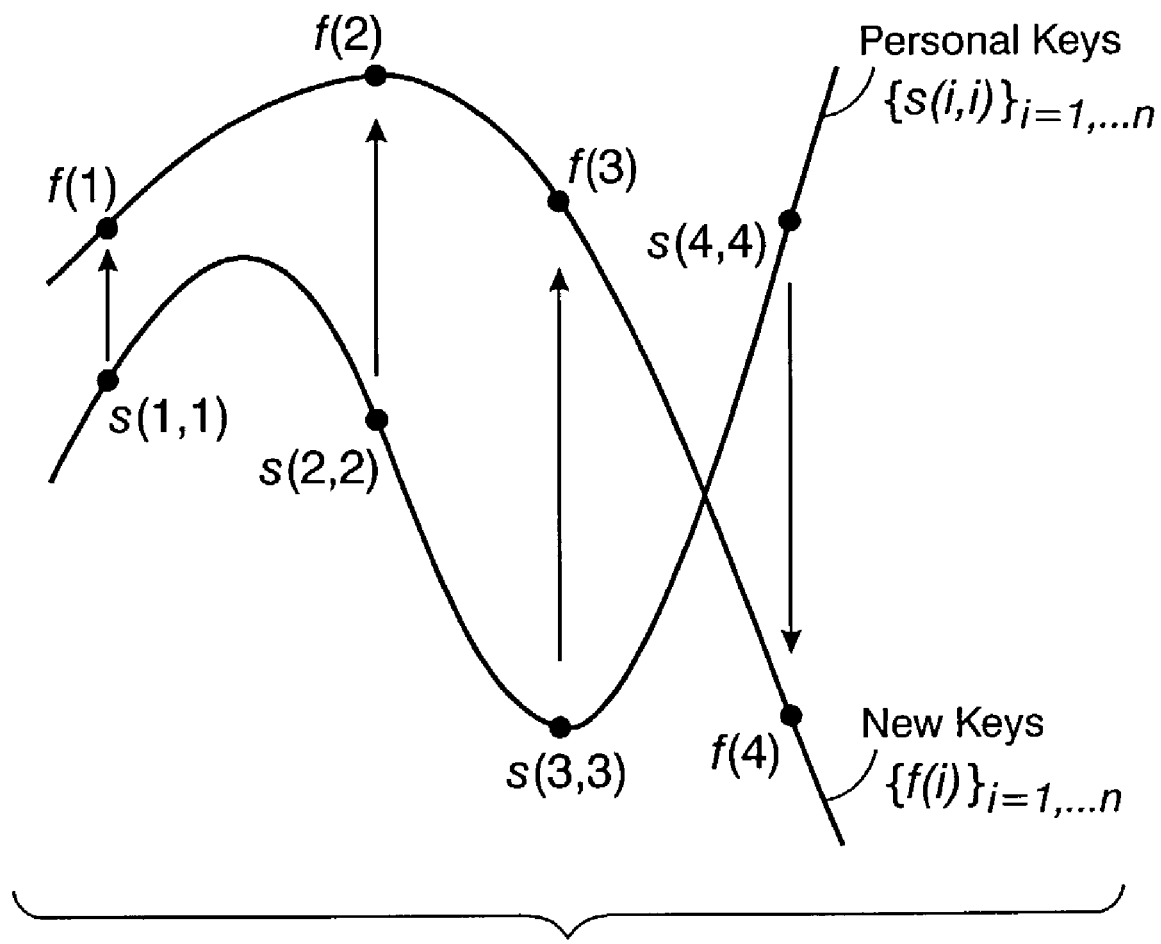
FIG. 6 illustrates one exemplary embodiment of a key distribution technique according to this invention.

FIG. 6 illustrates the key distribution technique. As shown in FIG. 6, in various exemplary embodiments, in the distribution technique or mechanism, for $i=1, \ldots, n$, $U_i$ stores personal key (N, i, s(i, i)). After the broadcast, a member $U_i$ is able to recover a new key f(i), but learns nothing about f(j) for $j \neq i$.

A key distribution scheme with t-revocation capability and without self-healing is described below as Construction 2.

first, as part of the setup stage, let t be a positive integer. Let $N \in F_q$, be an element that is not equal to any user's index. The group manager chooses at random from $F_q[x,y]$ a polynomial, $s(x,y) = a_{0,0} + a_{1,0}x + a_{0,1}y + \ldots + a_{t,t}x^t y^t$. For $i=1, \ldots, n$, user $U_i$ stores the personal key, (N,i,s(i,i)).

As part of the broadcast stage, the group manager chooses at random a polynomial of degree t in $Fq[x]$, f(x). Let $W \subseteq \{1, \ldots, n\}$, $|W|=t$, consist of the indices of the users that should not be allowed to recover a new key from the broadcast. The broadcast consists of the following polynomials:

$$\{f(x)+s(N,x)\} \cup \{w, s(w,x): w \in W\}. \quad (3)$$

As part of the key recovery stage, A user Us such that $i \notin W$, can evaluate each polynomial s(w,x) at x=i to get t points on the polynomial s(x,i). Coupling these with his personal key s(i,i), $U_i$ has t+1 points on s(x,i) and so is able to recover that polynomial and evaluate it at x=N to recover s (N,i). $U_i$ may then evaluate (f(x)+s(N,x)) at x=i, subtract off s(N,i) and recover a new individual key, f(i).

Because the revocation technique is of independent interest, we demonstrate its security before it is combined with the self-healing mechanism by assuming that Construction 2 is an unconditionally secure key distribution scheme with t-revocation capability as described below.

Note that the keys distributed in Construction 2, {f (1), . . . ,f(n)} are (t+1)-wise independent because f(x) is of degree t. The size of the broadcast, B, in Construction 2 is $O(t^2 \log q)$. The Naor-Pinkas scheme, which is an unconditionally secure method of distributing a common key, has broadcast size O(tlog q), so moving from the distribution of a single key to the distribution of a set of (t+1)-wise independent keys has multiplied the broadcast length by t.

By combining the techniques of Construction 1 with Construction 2, a session key distribution scheme that has t-revocation capability and is self-healing is constructed as described below.

The unconditionally secure self-healing session key distribution, Construction 3, is set up as discussed below.

first, let t be a positive integer, and let N be an element of $F_q$ that is not equal to any user index. The group manager chooses m polynomials $p_1(x), \ldots, p_m(x)$ in $F_q[X]$, each of degree t, and m session keys $K_1, \ldots, K_m \in F_q$, all at random, and defines a polynomial, $q_j(x) = K_j - p_j(x)$, for each $j=1,\ldots,m$. for each $j \in \{1, \ldots, m\}$, the group manager chooses m polynomials in $F_q[x,y]$ at random, $s_{1,j}, \ldots, s_{m,j}$, where for $i= 1, \ldots, m$, $s_{i,j}(x,y) =$ $$a_{0,0}^{i,j} + a_{1,0}^{i,j}x + a_{0,1}^{i,j}y + \ldots + a_{t,t}^{i,j}x^t y^t$$

For $i \in \{1, \ldots, n\}$, user $U_i$ stores the personal key: $S_i = \{N, i, s_{1,1}(i,i), \ldots, s_{m,1}(i,i), s_{1,2}(i,i), \ldots, s_{m,2}(i,i), \ldots, s_{1,m}(i,i), \ldots, s_{m,m}(i,i))\}$.

The broadcast is then computed by letting A, $R \subseteq \{U_1, \ldots, U_n\}$, $|R| \leq t$, enote the active users and revoking users in session j, respectively. The group manager chooses $W = \{w_1, w_2, \ldots, w_t\} \subseteq F_q$ such that the indices of the users in R are contained in W, none of the indices of the users in A are contained in W and $N \notin W$. The broadcast in period $j \in \{1, \ldots, m\}$, is $\beta_j^1 \cup \beta_j^2$ where:

$\beta_j^1 = \{p_{j'}(x) + s_{j',j}(N,x)\}_{j'=1,\ldots,j-1}$ $\cup \{K_j + s_{j,j}(N,x)\}$ $\cup \{q_{j'}(x) + s_{j',j}(N,x)\}_{j'=j+1,\ldots,m}$ $\beta_j^2 = \{w_l, \{s_{j',j}(w_l,x)\}_{j'=1,\ldots,m}\}_{l=1,\ldots,t}$ The session key and shares recovery in session j are determined as follows:

For all $i \in \{1, \ldots, n\}$, $U_i$ is able to recover the polynomial $s_{j,j}(x,i)$ using $\{s_{j,j}(w_l,x)\}_{l=1,\ldots,t}$ by evaluating the polynomials at $x=i$ and interpolating based on the points $(i, s_{j,j}(i,i))$ and $\{w_l, s_{j,j}(w_l,i))\}_{l=1,\ldots,t}$. Then Ui recovers Kj by evaluating $s_{j,j}(x,i)$ at $x=N$, and subtracting this value from $(K_j + s_{j,j}(N,x))|_{x=i}$.

Additionally, $U_i$ can interpolate to determine $\{s_{j',j}(x, i)\}_{j'=i,\ldots,j-1,j+1,\ldots,m}$ and thereby recover shares $\{p_{j'}(i)\}_{j'=1,\ldots,j-1}$ and $\{q_{j'}(i)\}_{j'=j+1,\ldots,m}$ in a similar manner.

Adding users to the group proceeds as in Construction 1. Provided the underlying field is sufficiently large, the group manager adds a new member in session j' by simply giving the user a unique identity, $i \in F_q$, and personal keys corresponding to the current and future sessions $\{s_{j,i}(i, i)\}_{j \in \{j',\ldots,m\} l \in \{j',\ldots,m\}}$ (keys corresponding to past sessions are unnecessary).

The broadcast size in the above construction is $O((mt^2+tm) \log q)$. Because Construction 3 is both a key distribution scheme with t-revocation capability and a self-healing session key distribution scheme, a lower bound on broadcast size follows from the expression $|B| \geq \max\{t^2 \log q, mt \log q\}$.

In various exemplary embodiments, the communication overhead can be reduced from $O((mt^2+mt)\log q)$ to $O((t^2+mt)\log q)$, while adding a moderate amount of additional computation at the user's end. In various exemplary embodiments, the self-healing key distribution system 200 uses the communication broadcast size reduction circuit, routine or application 270 to perform this operation.

The principle behind the reduction is to decrease the size of $\beta_j^2$ in Construction 3 by broadcasting a smaller set of polynomials, $\{s_{m,j}(w,x))\}_{w \in W}$, and making public a pseudorandom permutation a, with which each user can efficiently generate the necessary remaining polynomials, $\{s_{j',j}(w, x))\}_{j' \in \{1,\ldots,m-1\}, w \in W}$. The fact that σs output is pseudorandom is useful, because it ensures that with high probability, the entire collection of polynomials will appear random, and hence, indistinguishable from the collection generated entirely at randomly in Construction 3. It will be appreciated that the choice of pseudorandom σ is enabling but not absolutely necessary.

Because the smaller set of polynomials from which the others are defined can only be specified once the set of revoked users, and hence the set W, is known, we also need to modify the scheme to ensure that the personal keys allocated to users in the set-up phase don't introduce conflicts.

Before stating the construction, some new notation is introduced to make the presentation simpler. For any polynomial in $F_q[x]$, $f(x) = a_0 + a_1 x + \ldots + a_t x^t$, and any permutation of $F_q$, σ, let $\sigma(f(x)) = \sigma(a_0) + \sigma(a_1)x + \ldots + \sigma(a_t)x^t$.

In various exemplary embodiments according to the methods and systems of this invention, an unconditionally secure self-healing session key distribution variant of Construction 3 in which overhead is reduced, may be determined as discussed below.

Let t be a positive integer, and let N be an element of $F_q$ such that $N \notin \{1, \ldots, n\}$. The group manager chooses the session keys $K_1, \ldots, K_m \in F_q$, and the t-degree polynomials $p_1(x), \ldots p_m(x) \in F_q[x]$ all at random. Note that this determines the polynomials, $q_1(x), \ldots, q_m(x)$ as in Construction 1. In addition, for each $r, j \in \{1, \ldots, m\}$, the group manager defines $h_{r,j}(x)$ to be a randomly chosen polynomial of degree 2 t in $F_q[x]$. For $i=1, \ldots, m$, $U_i$ stores the personal key $\{N, i, h_{r,j}(i)\}_{r,j=1,\ldots,m}$. Finally, for $j=1, \ldots, m$, the group manager chooses a bivariate polynomial of degree t in each variable, $s_{m,j}(x,y) \in F_q[x,y]$ at random, and a pseudorandom permutation of $F_q$, σ. The permutation σ is made public.

To determine a broadcast session, let A, $R \subseteq \{U_1, \ldots, U_n\}$, $|R| \leq t-1$, denote the set of active members and the set of revoked users, respectively, in session j. The group manager chooses $W \subseteq F_q$ such that $|W|=t$, the indices of the users in R are in W, the indices of users in A are not, and $N \in W$. Let $W = \{w_1, \ldots, w_t\}$. For $j'=1, \ldots, m$ the group manager chooses $\{s_{j',j}(x,y)\}j'$ to be bivariate polynomials in $F_q[x,y]$ of degree t in each variable, such that for all $j'=1, \ldots, m$ and $i-1, \ldots, t$, $s_{j',j}(w_i, x) = \sigma^{m-j'}(s_{m,j}(w_i, x))$ The broadcast in period $j \in \{1, \ldots, m\}$, is $\beta_j^1 \cup \beta_j^2$ where:

$$B_j^1 = \{p_{j'}(x) + s_{j',j}(N, x)\}_{j'=1,\ldots,j-1}$$
$$\cup \{K_j + s_{j,j}(N, x)\}$$
$$\cup \{q_{j'}(x) + s_{j',j}(N, x)\}_{j'=j+1,\ldots,m}$$
$$B_j^2 = \{h_{j',j}(x) + s_{j',j}(x, x)\}_{j'=1,\ldots,m}$$
$$\cup \{w_i, s_{m,j}(w_i, x)\}_{i=1,\ldots,t}$$

Next, for the session key and shares recovery in session j, the following substeps are performed. First, $U_i$ recovers $s_{j',j}(i,i)$ for $j'=1,\ldots,m$ by evaluating $\{h_{j',j}(x) + s_{j',j}(x,x)\}$ at $x=i$ and subtracting $h_{j',j}(i)$. Then, each user applies the publicly known pseudorandom permutation σ to recover $\{s_{j',j}(w_1, x), \ldots, s_{j',j}(w_t, x)\}_{j' \in \{1,\ldots,m-1\}}$, using the fact that $s_{j',j}(wi, x) = \sigma^{m-j'}$ ($s_{m,j}(w_i,x)$). Recovery of the session keys and the key shares then proceeds as in Construction 3.

Adding users in Construction 4 is as straight forward. Provided the underlying field is sufficiently large, the group manager adds a user in session j by giving the users a unique identifier, $i \in F_q$, and the keys $\{h_{r,1}(i,i)\}_{r \in 1, \ldots, m, l \in (j, \ldots, m)}$.

To see that the choice of a pseudorandom permutation facilitates the construction, but is not essential, consider algebraic attacks in which a user $U_i$ who legitimately learns $q_j(i)$ (for example) and then, when revoked in session $j_i$, uses this knowledge to recover $s_{j,j1}(N,i)$ and then exploits an algebraic relationship between $s_{j1,j1}(x,y)$ and $s_{j,j1}(x,y)$ to learn session key, $K_{j1}$. The algebraic relationship is represented as $s_{j,j1}(N,i)=s_{j1,j1}(N,i)$, then $K_{j1}=K_{j1}+s_{j1,j1}(N,x)|_{x=i}-s_{j,j1}(N,i)$.

Using a pseudorandom permutation ensures that with high probability the resulting $s_{j',j}(x,y)$ polynomials chosen by the group manager, will be sufficiently different and the construction will not be vulnerable to such attacks. Although it is possible to accomplish this without a pseudorandom permutation, it is not possible for all permutations. Consider the extreme case of the identity permutation. If σ is the identity permutation, then it is possible for the group manager to choose $s_{j',j}(x,y)=s_{m,j}(x,y)$ for $j',j \in \{1, \ldots, m\}$. The resulting construction is vulnerable to exactly the kind of attack just described above. At the other end of the spectrum, it is also possible to use a truly random permutation to reduce overhead. However, since this potentially places a heavy computational burden on each user, this approach is less desirable.

After a set of m sessions has expired in Constructions 3 and 4, some rekeying of the users may be necessary before distributing new session keys. One reason for rekeying is because the state of the system has changed as a result of the broadcasts. For example, in each construction, portions of the personal keys of the revoked users are made public. One solution to this problem is to distribute a new set of secret keys to each user, and proceed as before. Another solution is to use a technique that originated in as discussed by P. Feldman, A practical Scheme for Non-Interactive Secret Sharing, in Proc. 28th IEEE Symposium on Foundations of Computer Science, 1987, pp. 427-437, which is incorporated herein by reference in its entirety, and is used in as discussed by M. Naor and B. Pinkas, Efficient Trace and Revoke Schemes, in Proceedings of Financial Cryptography 2000, Lecture Notes in Computer Science (2001) 1962, pp. 1-20, which is incorporated herein by reference in its entirety, which can be described as Shamir secret sharing in the exponent of a generator g, of a cyclic group, G. Moving operations to the exponent allows each user to evolve their secret keys from one set of m sessions to the next, thus making the scheme long-lived, meaning the scheme can continue without any unicasts from the group manager.

In various exemplary embodiments, this is accomplished through the broadcast of random values at the end of a set of m sessions, by the group manager using the secret key lifetime extension circuit, routine or application 280 in the self-healing key distribution system 200. Each user (revoked or not) is able to use the random values to calculate their own new personal key. This results in significant bandwidth savings over the simple approach of sending each user a new personal key via unicast, because if each user stores r keys, then r random values must be sent, in contrast to rn unicasts in the naive approach. The savings are reduced by a constant factor, however, because the former approach requires a larger underlying group size, for example approximately 160 bits, in order to ensure that the Decision Diffie-Hellman problem, a well known mathematical expression, is hard.

This technique, known as Construction 5, is applicable to both Constructions 3 and 4. However, the technique is demonstrated below for Construction 3 only, because the extension is somewhat simpler and all of the important underlying ideas are illustrated.

Construction 5 is secure provided that the Decision Diffie-Hellman (DDH) assumption is hard. We state the assumption here, referring to the discussion by D. Boneh, The Decision Diffie-Hellman Problem, in Proceedings of the Third Algorithmic Number Theory Symposium, Lecture Notes in Computer Science 1423, pp. 48-63, 1998, which is incorporated herein by reference in its entirety, for a more precise and detailed discussion and to the discussion by M. Naor and B. Pinkas, Efficient Trace and Revoke Schemes, in Proceedings of Financial Cryptography 2000, Lecture Notes in Computer Science (2001) 1962, pp. 1-20, which is incorporated herein by reference in its entirety.

DDH is defined for any cyclic group G and generator g. The DDH assumption is that it is difficult to distinguish between the distributions of $(g^a, g^b, g^{ab})$ and $(g^a, g^b, g^c)$, where a, b, and c are chosen randomly in $\{1, \ldots, |G|\}$. DDH is believed to be intractable in groups of large prime order.

Before beginning the construction it is helpful to introduce some additional notation. Given $f(x)=a_0+a_1 x+\ldots+a_t x^t \in G[x]$, let $g^{f(x)}=(g^{a_0}, \ldots, g^{a_t})$.

Construction 5, which is the Long-lived variant of Construction 3, is defined as follows:

To determine the set-up for the otth set of m sessions, the group manager randomly chooses integers $$v_{1,1}^\alpha, \ldots, v_{m,n}^\alpha \in Z_q^*$$

and broadcasts $$g^{v_{1,1}^\alpha}, \ldots, g^{v_{m,n}^\alpha}.$$

For $i=1, \ldots, n$, $U_i$ computes a new personal key, $\{g^{v_{j',j}^\alpha s_{j,j'}(i,1)}\}_{1',1 \in \{1, \ldots, m\}}$. The group manager randomly chooses $K_1^\alpha, \ldots, K_m^\alpha \in Z_p$ and the t-degree polynomials $p_1^\alpha, \ldots, p_m^\alpha \in Z_p[x]$. Note that this determines the polynomials $q_1^\alpha, \ldots, q_m^\alpha \in Z_p[x]$ as in Construction 3.

To broadcast in session of the (xth set of m sessions, let A, $R \subseteq \{U1, \ldots, U_n\}$, $|R| \leq t$, denote the active users and the revoked users, respectively. The group manager chooses $W \subseteq Z_p$ such that $|W|=t$, the indices of the revoked users are contained in W and the indices of the active users are not, and $N \notin W$. The broadcast period $j \in \{1, \ldots, m\}$, is $\beta_j^1 \cup \beta_j^2$ where:

$$B_j^1 = \{g^{p_j f'(x)+v_{j',j}^\alpha s_{j,j'}(N,x)}\}_{j'=1,\ldots,j-1}$$
$$\cup \{g^{K_j^\alpha+v_{j',j}^\alpha s_{j,j'}(N,x)}\}$$
$$\cup \{g^{q_j f'(x)+v_{j',j}^\alpha s_{j,j'}(N,x)}\}_{j'=j+1,\ldots,m}$$

$$B_j^2 = \{w, g^{v_{j',j}^\alpha s_{j,j'}(w,x)}\}_{w \in W, j' \in \{1,\ldots,m\}}$$

The session key and shares recovery is shown as follows. $U_i$ recovers $\{g^{v_{j',j}^\alpha s_{j,j'}(N,1)}\}_{j' \in \{1,\ldots,m\}}$ using $\{g^{v_{j',j}^\alpha s_{j,j'}(i,1)}\}_{j' \in \{1,\ldots,m\}}$ and $\{g^{v_{j',j}^\alpha s_{j,j'}(w,1)}\}_{w \in W, j' \in \{1,\ldots,m\}}$. This enables $U_i$ to recover the jth session key $g^{K_j^\alpha}$ and the shares, $\{g^{q_{j'}^\alpha(1)}\}_{j'=1,\ldots,j-1}$ and $\{g^{q_{j'}^\alpha(1)}\}_{j'=1,\ldots,j-1}$.

It will be appreciated that 2t+1 users can pool their personal keys and reconstruct $\{s_{i,j}(x,x)\}_{i,j}$, and then these users are able to retrieve session keys for the lifetime of the scheme. Hence, even with this long-lived self-healing scheme, occasionally "re-starting" the scheme by securely sending each user a fresh personal key, is desirable.

The techniques described herein are based in part of experimental data from experimentation performed on secure group communication for large, dynamic groups. In such a large group, for example 10000 or more members, membership may change frequently, and possibly every few seconds. The self-healing session key distribution techniques presented herein are well-suited for this setting because the system parameters affecting broadcast size are either independent of the number of members, as is the case for m, the number of sessions, and the key size, log q, whose value is determined by the necessary cryptographic strength, which is typically much larger than the group size, or grow much more slowly (as does the collusion resistance, t. The actual session length may vary according to the key size used and the rate of change in group membership. In practice, the actual session length may be in the range of a few seconds to a minute.

It will be appreciated that that q, should at least $2^{64}$, for example a 64-bit number. This ensures that the broadcast session keys $K_1,\ldots,K_m$ are also 64 bits long. It is anticipated, these session keys will be used in a symmetric cipher such as, for example, advanced encryption standard (AES), for which a 64-bit key currently provides reasonable security for a short-lived session key.

Figure 7:
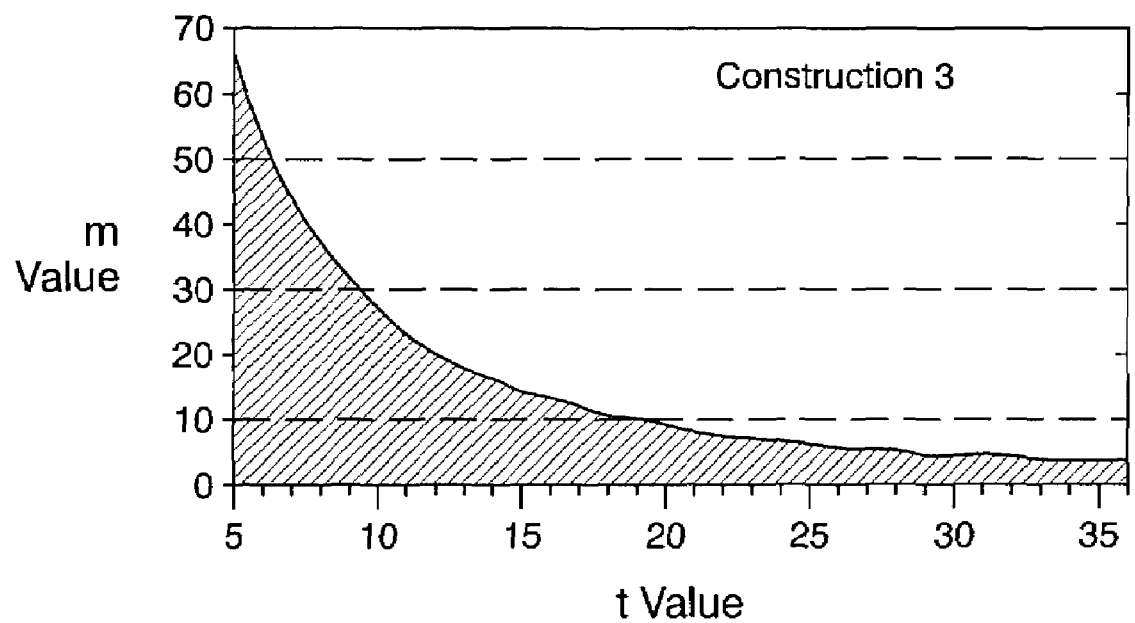
FIG. 7 shows one exemplary embodiment of values for the number of sessions m and the collusion resistance t, when the maximum key distribution broadcast size is 64 kilobits, for the Construction 3 self-healing key revocation technique according to this invention.
Figure 8:
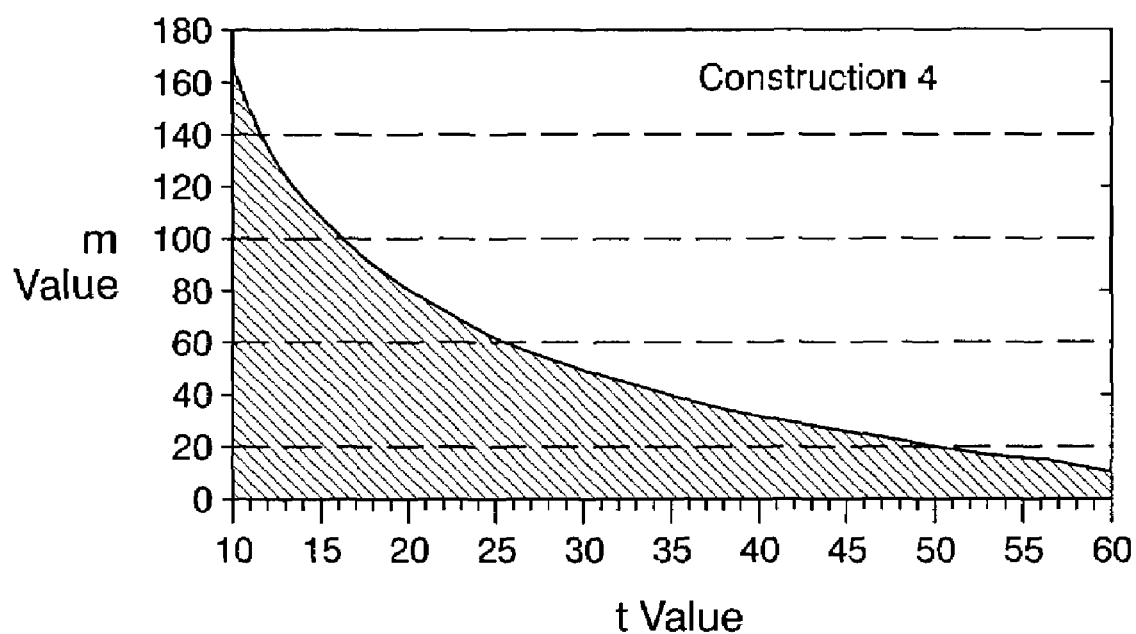
FIG. 8 shows one exemplary embodiment of values for the number of sessions m and the collusion resistance t, when the maximum key distribution broadcast size is 64 kilobits, for the Construction 4 self-healing key revocation technique according to this invention.

The maximum key distribution broadcast size in an IPv4-based network is 64 KB. FIGS. 7 and 8 show possible values for m and t, given this constraint for exemplary embodiments described as Constructions 3 and 4, respectively. It will be appreciated that larger broadcasts are less likely to reach their destinations. If it is assumed key distribution broadcasts are lost independently at random at a rate of 1%, and consider a key distribution broadcast made out of 45 such key distribution broadcasts or fragments, then there is a 36% chance that one fragment, and hence the broadcast as a whole, will not reach its destination. It will be appreciated that most IP stacks will break large UDP key distribution broadcasts down to 1500-byte Ethernet-key distribution broadcast-sized fragments. If the loss rate reaches 5%, a fairly high value, then the probability that the 64 KB broadcast goes through is only 10%. In other words, recipients will see only every tenth broadcast. Choosing m to be between 10 and 20 solves this problem as users will, in fact, very likely be able to recover missed session keys through self-healing.

As shown in FIGS. 7 and 8, fixing m to be between 10 and 20 provides values for t between 15 and 20 for Construction 3, and even larger values for Construction 4. The dynamic nature of the group supports providing only a moderate degree of collusion resistance. Because the group is dynamic, collusions formed in a pervious session may not be as useful in the current one (e.g., if a member is now revoked, and hence, does not have useful information on the current session key), so a certain amount of new collusion may be necessary in each session. The difficulty in forming useful collusions within a short time period reduces the needed degree of collusion resistance. Therefore, the above mentioned values for t and m should be adequate for most applications.

If the high likelihood of broadcast loss and the associated high latency for key recovery, for example it may take a few sessions until the key of a lost broadcast is learned, associated with Construction 3 is unacceptable for a given application, there are two straightforward solutions. First, the application can use Construction 4 and/or use smaller values for t and m. This will decrease the size of the broadcast substantially, and lower the probability of broadcast loss, in which case a small number of sessions m is sufficient. Second, an implementation in which the group manager broadcasts the m−1 shares for previous and future keys, and the current session key, independently, can be used (i.e., the group manager performs the fragmentation). With such an implementation, m smaller broadcasts are used to send the same information as is currently done in one broadcast. Every single one of the smaller broadcasts are used to send the same information as is currently done in one broadcast. Every single one of the smaller broadcasts has a higher probability of reaching its target, and the receivers can still use the subset of shares they receive to self-heal on some of the missed broadcasts.

Because the processes discussed above are defined over a fixed period of m sessions, the session keys corresponding to sessions late in the sequence may be more vulnerable to key distribution broadcast loss because there is less opportunity to form a "sandwich" of received key distribution broadcasts. This may also be true of session keys corresponding to the beginning sessions (although, if unicasts are already being used to distribute personal keys, it might make sense to send the first key distribution via unicast as well). By making m a bit larger, we can ensure that with high probability each user will either receive, or be able to recover via self-healing, most of the session keys. However, there is still the issue of distributing new personal keys to each in member in order to deploy the self-healing key distribution for a new round of m sessions.

Self-healing key distribution provides reliable multicast session key distribution in a manner that is stateless and conducive to traceability. A reasonable degree of resistance to both adversarial coalitions and network key distribution broadcast loss can be achieved with overhead of just a single UDP key distribution broadcast per session. In addition, members who experience key distribution broadcast loss can recover missed session keys efficiently upon receipt of a single additional key distribution broadcast. This cuts back on network traffic, decreases the load on the group manager, and reduces the risk of user exposure through traffic analysis.

Self-healing key distribution may be useful in high-security operations, such as the military, where it is necessary to change session keys frequently and to be able to revoke users quickly. Self-healing key distribution works well here because the length of time over which a user must buffer encrypted messages is short, and revocation can be accomplished quickly with the broadcast of a single key distribution broadcast. In addition, the self-healing approach may be useful in commercial content distribution applications in which the content, is highly sensitive. For example, during mergers and acquisitions extensive negotiations involving many representatives from both sides may take place. Frequent session key changes may be necessary and the ability to revoke low-ranking parties during certain exchanges is desirable.

For applications such as those described above, the systems and methods of this invention use polynomial-based secret sharing techniques to achieve non-interactive resistance to key distribution broadcast loss through small broadcasts. In particular, in various exemplary embodiments, there is provided an unconditionally secure construction with broadcast overhead that is on the order of $(t^2m)$ log q bits, where log q is the session key size, t is the collusion resistance, and m denotes the number of sessions over which self-healing is possible, which is closely correlated with anticipated packet loss.

Further, the systems and methods of this invention allow the possibility of achieving broadcasts of size $O((t^2+mt)$ log q) bits, by shifting a moderate amount of computation to the user's end. Each of these constructions provides for fast self-healing (the core operation is simple polynomial interpolation) over a fixed set of m sessions and is resistant to collusion.

The use of modular exponentiation-based secret sharing technique as discussed by P. Feldman, A practical Scheme for Non-Interactive Secret Sharing, in Proc. 28th IEEE Symposium on Foundations of Computer Science, 1987, pp. 427-437, which is incorporated herein by reference in its entirety, is used to extend the lifetime of these constructions by allowing users to evolve their personal keys from a base set to an appropriate set of keys for the current set of sessions. In all of these constructions, recovery from loss is possible with no delay on the user's part-after several key distribution packets are lost, a single received key distribution packet is sufficient to recover all the missed session keys. The constructions are stateless; group members are not penalized for being off-line for a period of time. This property is important in wireless applications in which members can quickly become off-line by moving out of broadcast range. In addition, all of the personal keys in the system are traceable. A consequence of the traceability and collusion resistance is that the only way to break the system in a long-term sense without risk of identification, is to form a coalition of more than t users.

Further, it will be appreciated that when implementing a self-healing key distribution scheme, the core issue is parameter choice/selection that is both appropriate for the intended application and compatible with existing network protocols. As discussed above, the trade-offs between the system parameters that exist while staying within IP packet size constraints are considered. Even if parameters are such that packet fragmentation is required, for example the size constraints are not met, the fragments can be formed in such a way that each fragment is useful to a member whether or not any other fragments are received. As a result, a member may still be able to use the received packets to self-heal or recover session keys directly, even when the packets are fragments of the actual key distribution broadcasts.

Figure 9:
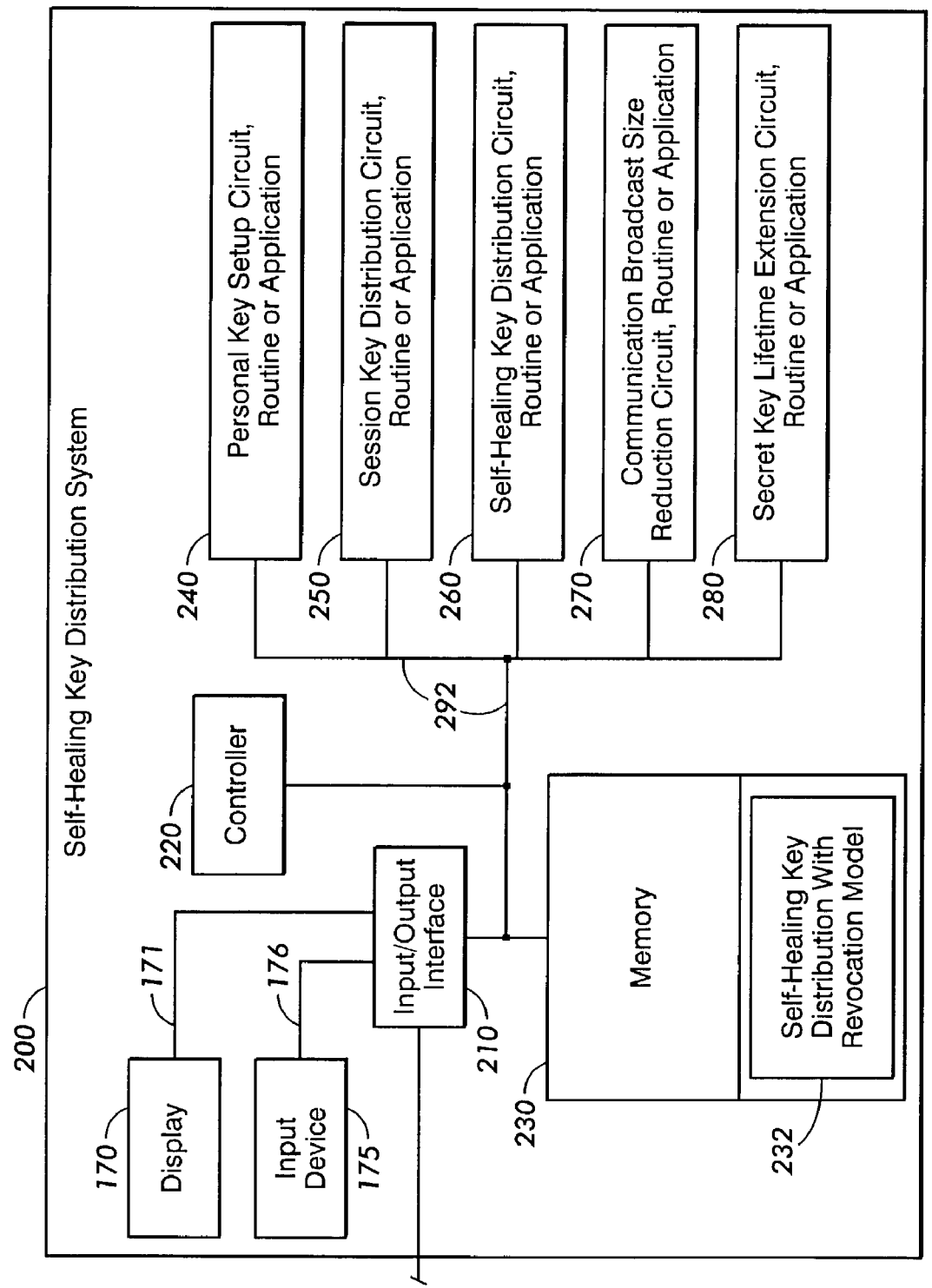
FIG. 9 is a functional block diagram of one exemplary embodiment of a self-healing key distribution system according to this invention.

FIG. 9 illustrates a functional block diagram of one exemplary embodiment of the self-healing key distribution system 200 according to this invention. As shown in FIG. 8, the self-healing key distribution system 200 includes one or more display devices 170 usable to display information to one or more users, and one or more user input devices 175 usable to allow one or more users to input data into the self-healing key distribution system 200. The one or more display devices 170 and the one or more input devices 175 are connected to the self-healing key distribution system 200 through an input/output interface 210 via one or more communication links 171 and 176, respectively, which are generally similar to the link 160 above. In various exemplary embodiments, the self-healing key distribution system 200 includes one or more of a controller 220, a memory 230, a personal key setup circuit, routine or application 240, a session key distribution circuit, routine or application 250, a self-healing key distribution circuit, routine or application 260, a self-healing key reconstruction with revocation circuit, routine or application 270, which are interconnected over one or more data and/or control buses and/or application programming interfaces 292.

In various exemplary embodiments, the self-healing key distribution system 200 may optionally include a communication broadcast size reduction circuit, routine or application 280 and a secret key lifetime extension circuit, routine or application 290, which are interconnected over one or more data and/or control buses and/or application programming interfaces 292. The memory 230 includes one or more of a self-healing key distribution and/or reconstruction with revocation model 232.

The controller 220 controls the operation of the other components of the self-healing key distribution system 200. The controller 220 also controls the flow of data between components of the self-healing key distribution system 200 as needed. The memory 230 can store information coming into or going out of the self-healing key distribution system 200, may store any necessary programs and/or data implementing the functions of the self-healing key distribution system 200, and/or may store data and/or user-specific key broadcast information at various stages of processing.

The memory 230 includes any machine-readable medium and can be implemented using appropriate combination of alterable, volatile or non-volatile memory or non-alterable, or fixed, memory. The alterable memory, whether volatile or non-volatile, can be implemented using any one or more of static or dynamic RAM, a floppy disk and disk drive, a writable or re-rewriteable optical disk and disk drive, a hard drive, flash memory or the like. Similarly, the non-alterable or fixed memory can be implemented using any one or more of ROM, PROM, EPROM, EEPROM, an optical ROM disk, such as a CD-ROM or DVD-ROM disk, and disk drive or the like.

In various exemplary embodiments, the self-healing key distribution model 232 which the self-healing key distribution system 200 uses to construct/recover a lost key for a missing broadcast is based on secret sharing techniques discussed above to bind the ability of users to recover from key distribution broadcast loss to the user's membership status.

To enable secure multicast communication between the group members/users $U_1$-$U_n$ over the public channel or non-secure communication network, the group manager $U_0$ issues to each group user a personal key $S_1$-$S_n$. In various exemplary embodiments, the group manager $U_0$ employs one or more personal key distribution circuits, routines or applications 240 to issue a personal key to each group user $U_1$-$U_n$.

Periodically, the group manager issues a session key to group members. In various exemplary embodiments, the group manager employs one or more circuits, routines or applications, including for example the session key distribution circuit, routine or application 250 to distribute key distribution broadcasts to the user member.

In various exemplary embodiments, to allow the reconstruction of a lost key using one or more of the self-healing techniques discussed above, the group manager provides encoded key information using one or more circuits, routines or applications, including for example the self-healing key distribution circuit, routine or application 260.

To reconstruct/recover/determine a lost key distribution broadcast, the user member employs the self-healing key distribution/reconstruction circuit, routine or application 270 to combine the information from any key distribution broadcast preceding the lost key distribution broadcast with information from any key distribution broadcast following the lost key distribution broadcast based on a self-healing key distribution technique.

In various exemplary embodiments, to reduce the size of the broadcast, the user member employs the communication broadcast size reduction circuit, routine or application 280 using one or more broadcast size reduction techniques discussed above.

In various exemplary embodiments, to extend the life of the secret key provided, the user member employs the secret key lifetime extension circuit, routine or application 290 using one or more secret key lifetime extension techniques discussed above.

It will be appreciated by those skilled in the art that in any application of self-healing key distribution the expected number of consecutive sessions in which key distribution broadcasts are lost must be less than the number of sessions in-between any two intervals of membership for a particular user. This is generally the case. For example, in group conferencing over the Internet, a burst of loss amongst the key distribution broadcasts is likely to only cover an interval of time on the order of seconds, however the length of time during which a user may be revoked (to allow for discussion of sensitive information, for example) will be at least on the order of several minutes. The self-healing approach to reliable key distribution is applicable for such applications because it is unlikely that a user will abuse self-healing by leaving and rejoining the group within a short time period.

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A collusion resistant method for determining an intermediate session key contained in a transmitted but missed intermediate key distribution broadcast, the intermediate key distribution being of a sequence of a plurality of key distributions distributed to a plurality of users, wherein the method is resistant to collusion attack by any coalition of up to a predetermined number t of users which have been revoked, the method comprising:

(a):
  receiving at a local user a first broadcast that precedes the intermediate key distribution broadcast, wherein the first broadcast corresponds to a first session that precedes the intermediate session, and wherein the first broadcast includes:
    a first polynomial corresponding to a first portion of the intermediate session key; and
    a first set of t polynomials corresponding to the identifiers of the t revoked users and the index of the first session;
  plugging the local user's identifier into the first set of t polynomials to obtain a first set of t data points;
  evaluating the first portion of the intermediate session key based on:
    (1) an interpolation of the first set of t data points and the local user's personal key; and
    (2) the local user's identifier;
(b):
  receiving at the local user a second broadcast that follows the intermediate key distribution broadcast, wherein the second broadcast corresponds to a second session that follows the intermediate session, and wherein the second broadcast includes:
    a second polynomial corresponding to a second portion of the intermediate session key; and
    a second set of t polynomials corresponding to the identifiers of the t revoked users and the index of the second session;
  plugging the local user's identifier into the second set of t polynomials to obtain a second set of t data points;
  evaluating the second portion of the intermediate session key based on:
    (1) an interpolation of the second set of t data points and the local user's personal key; and
    (2) the local user's identifier; and (c):
  combining the first portion and the second portion to obtain the intermediate session key.

2. The method of claim 1, further comprising constructing the personal key by:
  receiving a set of polynomials each of which has two variables and is of an order of t; and
  plugging the local user's identifier as the value for both variables for the received polynomials to obtain a corresponding number of values, r.

3. The method of claim 1, wherein combining the first portion and the second portion to obtain the intermediate session key involves:
  evaluating the first polynomial to obtain a first value by plugging the local user's identifier into the first polynomial;
  evaluating the second polynomial to obtain a second value by plugging the local user's identifier into the second polynomial;
  producing a sum by adding the first value to the second value;
  producing a third value by plugging the local user's identifier into the interpolation obtained in operation (a)(1) or (b)(1) as recited in claim 1; and
  subtracting the third value from the sum.

4. The method of claim 1, wherein the first portion of the intermediate session key contained within the preceding key distribution broadcast is one of a plurality of session key shares corresponding to a number of session keys to be contained in key distribution broadcasts following the preceding key distribution broadcast.

5. The method of claim 1, wherein the second portion of the intermediate session key contained within the subsequent key distribution broadcast is one of a plurality of session key shares corresponding to a number of session keys that were contained in key distribution broadcasts that preceded the subsequent key distribution broadcast.

6. The method of claim 1, wherein the intermediate distribution broadcast, the preceding key distribution broadcast and the subsequent key distribution broadcast are distributed over an non-secure communication network.

7. The method of claim 1, wherein combining at least the first portion of the intermediate session key contained within the preceding key distribution broadcast and the second portion of the intermediate session key contained within the subsequent key distribution broadcast uses one or more self-healing session key combination techniques.

8. A computer-readable medium storing instructions which, when executed by a computer, cause the computer to perform a collusion resistant method for determining an intermediate session key contained in a transmitted but missed intermediate key distribution broadcast, the intermediate key distribution being of a sequence of a plurality of key distributions distributed to a plurality of users, wherein the method is resistant to collusion attack by any coalition of up to a predetermined number t of users which have been revoked, the method comprising:

(a):
  receiving at a local user a first broadcast that precedes the intermediate key distribution broadcast, wherein the first broadcast corresponds to a first session that precedes the intermediate session, and wherein the first broadcast includes:
    a first polynomial corresponding to a first portion of the intermediate session key; and a first set of t polynomials corresponding to the identifiers of the t revoked users and the index of the first session;

plugging the local user's identifier into the first set of t polynomials to obtain a first set of t data points;

evaluating the first portion of the intermediate session key based on:
(1) an interpolation of the first set of t data points and the local user's personal key; and
(2) the local user's identifier;

(b):

receiving at the local user a second broadcast that follows the intermediate key distribution broadcast, wherein the second broadcast corresponds to a second session that follows the intermediate session, and wherein the second broadcast includes:

a second polynomial corresponding to a second portion of the intermediate session key; and a second set of t polynomials corresponding to the identifiers of the t revoked users and the index of the second session; plugging the local user's identifier into the second set of t polynomials to obtain a second set of t data points;

evaluating the second portion of the intermediate session key based on:
(1) an interpolation of the second set of t data points and the local user's personal key; and
(2) the local user's identifier; and (c):

combining the first portion and the second portion to obtain the intermediate session key.

9. The computer-readable medium of claim 8, wherein the method further comprises constructing the personal key by:
receiving a set of polynomials each of which has two variables and is of an order of t; and
plugging the local user's identifier as the value for both variables for the received polynomials to obtain a corresponding number of values, r.

10. The computer-readable medium of claim 8, wherein combining the first portion and the second portion to obtain the intermediate session key involves:
evaluating the first polynomial to obtain a first value by plugging the local user's identifier into the first polynomial;
evaluating the second polynomial to obtain a second value by plugging the local user's identifier into the second polynomial;
producing a sum by adding the first value to the second value;
producing a third value by plugging the local user's identifier into the interpolation obtained in operation (a)(1) or (b)(1) as recited in claim 1; and
subtracting the third value from the sum.

11. The computer-readable medium of claim 8, wherein the first portion of the intermediate session key contained within the preceding key distribution broadcast is one of a plurality of session key shares corresponding to a number of session keys to be contained in key distribution broadcasts following the preceding key distribution broadcast.

12. The computer-readable medium of claim 8, wherein the second portion of the intermediate session key contained within the subsequent key distribution broadcast is one of a plurality of session key shares corresponding to a number of session keys that were contained in key distribution broadcasts that preceded the subsequent key distribution broadcast.

13. The computer-readable medium of claim 8, wherein the intermediate distribution broadcast, the preceding key distribution broadcast and the subsequent key distribution broadcast are distributed over an non-secure communication network.

14. The computer-readable medium of claim 8, wherein combining at least the first portion of the intermediate session key and the second portion of the intermediate session key involves using one or more self-healing session key combination techniques.

15. A collusion resistant method for distributing an intermediate session key contained in a transmitted but missed intermediate key distribution broadcast, the intermediate key distribution being of a sequence of a plurality of key distributions distributed to a plurality of users, wherein the method is resistant to collusion attack by any coalition of up to a predetermined number t of users which have been revoked, the method comprising:

(a):

transmitting to a remote device a first broadcast that precedes the intermediate key distribution broadcast, wherein the first broadcast corresponds to a first session that precedes the intermediate session, and wherein the first broadcast includes:

a first polynomial corresponding to a first portion of the intermediate session key; and a first set of t polynomials corresponding to the identifiers of the t revoked users and the index of the first session;

allowing the remote device to plug a user's identifier into the first set of t polynomials to obtain a first set of t data points;

allowing the remote device to evaluate the first portion of the intermediate session key based on:
(1) an interpolation of the first set of t data points and the local user's personal key; and
(2) the local user's identifier;

(b):

transmitting to the remote device a second broadcast that follows the intermediate key distribution broadcast, wherein the second broadcast corresponds to a second session that follows the intermediate session, and wherein the second broadcast includes:

a second polynomial corresponding to a second portion of the intermediate session key; and a second set of t polynomials corresponding to the identifiers of the t revoked users and the index of the second session;

allowing the remote device to plug the user's identifier into the second set of t polynomials to obtain a second set of t data points;

allowing the remote device to evaluate the second portion of the intermediate session key based on:
(1) an interpolation of the second set of t data points and the local user's personal key; and
(2) the local user's identifier; and (c):

allowing the remote device to combine the first portion and the second portion to obtain the intermediate session key.

16. The method of claim 15, further comprising:
transmitting to the remote device a set of polynomials each of which has two variables and is of an order of t; and
allowing the remote device to construct the personal key by plugging the local user's identifier as the value for both variables for the received polynomials to obtain a corresponding number of values, r.

17. The method of claim 15, wherein allowing the remote device to combine the first portion and the second portion to obtain the intermediate session key involves allowing the remote device to:
- evaluate the first polynomial to obtain a first value by plugging the local user's identifier into the first polynomial;
- evaluate the second polynomial to obtain a second value by plugging the local user's identifier into the second polynomial;
- produce a sum by adding the first value to the second value;
- produce a third value by plugging the local user's identifier into the interpolation obtained in operation (a)(1) or (b)(1) as recited in claim 1; and
- subtract the third value from the sum.

18. The method of claim 15, wherein the first portion of the intermediate session key contained within the preceding key distribution broadcast is one of a plurality of session key shares corresponding to a number of session keys to be contained in key distribution broadcasts following the preceding key distribution broadcast.

19. The method of claim 15, wherein the second portion of the intermediate session key contained within the subsequent key distribution broadcast is one of a plurality of session key shares corresponding to a number of session keys that were contained in key distribution broadcasts that preceded the subsequent key distribution broadcast.

20. The method of claim 15, wherein the intermediate distribution broadcast, the preceding key distribution broadcast and the subsequent key distribution broadcast are distributed over an non-secure communication network.

* * * * *